US012211329B1

(12) United States Patent
Tikkanen et al.

(10) Patent No.: US 12,211,329 B1
(45) Date of Patent: Jan. 28, 2025

(54) METHOD AND MEANS FOR MULTI ACCESS MODE LOCK SYSTEM

(71) Applicant: ILOQ OY, Oulu (FI)

(72) Inventors: Väinö Tikkanen, Kontio (FI); Tomi Karjalainen, Espoo (FI); Mika Piirainen, Oulu (FI); Jani Järvinen, Oulu (FI)

(73) Assignee: iLOQ Oy, Oulu (FI)

( * ) Notice: Subject to any disclaimer, the term of this patent is extended or adjusted under 35 U.S.C. 154(b) by 0 days.

(21) Appl. No.: 18/646,477

(22) Filed: Apr. 25, 2024

Related U.S. Application Data

(60) Provisional application No. 63/608,484, filed on Dec. 11, 2023.

(51) Int. Cl.
*G07C 9/00* (2020.01)
*E05B 47/00* (2006.01)

(52) U.S. Cl.
CPC .......... *G07C 9/00309* (2013.01); *E05B 47/00* (2013.01); *G07C 9/00857* (2013.01); *G07C 2009/00642* (2013.01); *G07C 2009/00865* (2013.01)

(58) Field of Classification Search
None
See application file for complete search history.

(56) References Cited

U.S. PATENT DOCUMENTS 5,844,496 A * 12/1998 Seki ................... G07C 9/00182 340/9.13
10,089,811 B2 * 10/2018 Ufkes ................. E05B 47/0004
11,566,446 B2 1/2023 Pukari
11,619,069 B2 4/2023 Pukari
2004/0150521 A1 * 8/2004 Stilp .................. G08B 13/2454 340/539.22
2011/0128121 A1 * 6/2011 Shachar ............. G07C 9/00309 340/5.24
2020/0090439 A1 * 3/2020 Serfaty ................... G07F 17/10

FOREIGN PATENT DOCUMENTS

JP 2014190122 A 10/2014

* cited by examiner

*Primary Examiner* — Carlos Garcia
(74) *Attorney, Agent, or Firm* — Patterson + Sheridan, LLP

(57) ABSTRACT

The invention relates to locks. More particularly, aspects of the invention relate to a lock that can be used to lock a door, and which features multiple modes to access the lock in order to open or close the lock. The disclosed lock combines different power sources with different access technologies resulting in a lock that will remain functional for a very long time without maintenance.

27 Claims, 14 Drawing Sheets

METHOD AND MEANS FOR MULTI ACCESS MODE LOCK SYSTEM

TECHNICAL FIELD OF INVENTION

The invention relates to locks. More particularly, the invention relates to a lock that can be used to lock a door, and which features multiple modes to access the lock in order to open or close the lock.

BACKGROUND

The real estate market is going through a transformation in locking technology, as more transient use, such as Airbnb and the like become possible with digitalisation. The modes of access suitable for owner occupier, or long-time renter, no longer fit the more transient segment of real estate use.

At the same time, there is real pressure on property maintenance fees, and modem more developed housing technologies should ideally reduce operation costs.

Applicant believes the closest prior art is in fact a publication from the Applicant U.S. Ser. No. 11/566,446B2.

JP2014190122 is also cited here as reference, which discloses unlocking an electric lock device with a mobile application.

More versatile modes of access are thus needed for real estate.

Embodiments of this invention will now improve upon the earlier art of the applicant, and the available prior art, and address the aforementioned needs felt on the modem property market.

SUMMARY

Embodiments of the invention under study are directed towards a system and a method for effectively providing multimode access to a low maintenance lock system. This is achieved by realising a mix of self-powered access modes and battery powered access modes in the lock system. This allows a very small power burden on only a limited selection of access modes. Or a selected single access mode requiring battery power, which is not used so often, when substantial practical use of the lock system takes place with the self-powered access modes. This allows for matching elongated battery durations with very low use frequency of battery powered access modes in an otherwise actively used lock. In some embodiments, the battery life and the estimated lock system lifetime are the same. This results in a very low maintenance low-cost lock system, which can still be consumer friendly and technology agile, providing multiple different access modes with different technologies to fit different consumer tastes and needs.

One aspect of the invention involves three access modes. The first access mode is by means of a mechanical key insertion into the physical keyhole. This access mode is preferably configured as self-powered, and the power to operate the lock is derived from the muscle power of the user using the key. For example, the mechanical insertion of the key into the keyhole is converted into electrical energy that is used to power the lock. Similarly, the mechanical rotation of the key in the keyhole can be converted into electrical energy used to power the lock.

The second access mode typically takes place via a communication channel such as NFC, Bluetooth, or the like. In this second access mode a digital key is communicated to the lock via a digital communication channel, and the correct digital key thereby opens the lock. The proximity of the user's mobile phone can be used to power the lock, for example NFC can be used to power the lock, or the wireless charging of the mobile phone such as Qi, can be used to power the lock. In the first two access modes no battery is required, because the opening activity can power the entire energy budget of the lock.

However, it is beneficial to also have one access mode that does not require a key or a device to access the lock. In one aspect of the invention, this third access mode is a numerical code. However, it is very difficult to make this access mode self-powered. There needs to be always a digit seed in the lock, so that an original different numerical code can be generated at any point in time for any person. This consumes some power, but does not generate any power. Similarly, a number dial or keyboard that might be used once every two years is very difficult to realise as a self-powered solution. Therefore, a battery is preferred to power this third access mode.

However, in some embodiments the existing energy harvesting methods of the lock also provide power to the digit seed and the number dial. This realises a fully self-powered lock with three access modes that does not need a battery.

By "digit seed" we mean a number generator that generates a predetermined numerical code based on, for example the time. Preferably, the lock system has a low power clock that is used to generate the numerical code with the digit seed algorithm. This way, the digit seed requires no communication in and out the lock system, as long as the clock stays on time.

In preferable embodiments of the invention, the primary access modes are self-powered, for example the aforementioned first and second access modes. Preferably, there is also an infrequent back-up access mode, such as the aforementioned third access mode, involving a numerical code that is operated in the lock system based on battery power. The battery lifetime can be set for e.g. 20 years, which is the typical lifetime of a door lock system also. Thus, no battery changes would be required with the inventive lock system.

All three access modes are preferably realised in a single lock cylinder in accordance with the invention, so they can be taken into use and/or installed at the same time.

It is preferable that the operation power of the lock mechanism is very low. One lock mechanism that works very well with the invention is based on a magnetic actuator involving interaction between a hard magnet and a semi-hard magnet as described in U.S. Ser. No. 11/619,069 of the applicant. This document is incorporated here by reference.

A further object of embodiments of the invention is to present a cloud system that allows transient use where people use physical keys, key fobs, mobile phones, mobile phone apps and temporary numerical codes to access the property. This aspect of the invention is preferable for example in a situation where the owner household lives in the property part of the time, and rents it out part of the time on Airbnb or booking.com or the like service. The more permanent users or household members may use the physical keys, key fobs, or their mobile phone and/or mobile app to authenticate to the lock system and access the property. A one-off visitor to the property would preferably use a numerical code only established for him.

The cloud server and the lock systems typically have identical synchronised digit seed generators, so the cloud system can generate a unique numerical access code for a single lock system or a plurality of lock systems without establishing a communication connection to the lock system. Avoiding the use of this communication connection is preferable, as this communication connection would consume substantial power. This numerical code of embodiments of the invention is typically time dependent. In preferred embodiments of the invention, the numerical code can be messaged and/or emailed to the user, who is typically a temporary user of the property.

Another embodiment of the invention involves the cloud server generating the numerical code access to plurality of lock systems, and to a plurality of users. This way, an access right group of temporary users of the property can be created in accordance with the invention. In some aspects of the invention, all lock systems of the plurality of locks have the same digit seed or deterministic number generator.

A multi access mode lock system in accordance with the invention comprises a locking mechanism configured to mechanically open and lock a door, a PIN code input interface, a physical keyhole, and an NFC transmitter and/or receiver, configured to accept a key via NFC, and a battery and is characterized in that, a mechanical key insertion into the physical keyhole is configured to collect work energy from the key insertion and power the locking mechanism using this energy, optionally without using the battery power, and NFC transmitter and/or receiver is configured to collect electromagnetic energy from the NFC signal and power the locking mechanism using this energy, optionally without using the battery power, and only the PIN code input interface with locking mechanism uses battery power.

A software program product stored in non-transient memory medium in accordance with the invention is configured to operate a multi access mode lock system, comprising a locking mechanism configured to mechanically open and lock a door, a PIN code input interface, a physical keyhole, and an NFC transmitter and/or receiver, configured to accept a key via NFC, and a battery and is characterized in that, a mechanical key insertion into the physical keyhole is configured to collect work energy from the key insertion and power the locking mechanism using this energy, optionally without using the battery power, and NFC transmitter and/or receiver is configured to collect electromagnetic energy from the NFC signal and power the locking mechanism using this energy, optionally without using the battery power, and only the PIN code input interface with locking mechanism uses battery power.

A method of operating a multi access mode lock system in accordance with the invention has the system comprising a locking mechanism configured to mechanically open and lock a door, a PIN code input interface, a physical keyhole, and an NFC transmitter and/or receiver, configured to accept a key via NFC, and a battery, and is characterized in that, a mechanical key insertion into the physical keyhole collects work energy from the key insertion and powers the locking mechanism using this energy, optionally without using the battery power, and NFC transmitter and/or receiver collects electromagnetic energy from the NFC signal and powers the locking mechanism using this energy, optionally without using the battery power, and only the PIN code input interface with locking mechanism uses battery power.

Some or all of the advantages of embodiments of the invention are accrued with embodiments that have different access modes. The self-powered access modes used by the regular users consume almost no energy, as the power is generated by the use itself. The numerical access code generation requires some power, but this use is interleaved with the self-powered use of the lock. The synergistic advantage in the combination is that the lock can experience very transient use with very different access modes, but the lock system can still be designed so that it requires no maintenance, or almost no maintenance over the lifetime of the lock system, which lock lifetime is typically 20 years.

In addition, and with reference to the aforementioned advantage accruing embodiments, the best mode of the invention is considered to be a multi access mode lock with three access modes. In the best mode, the physical key access, and the mobile phone app-based access are configured as self-powered. In the best mode, the third access mode is a numerical access code generated using a digit seed dependent on the time, and this third access mode is battery powered, but does not use any communication between the lock and the cloud server generating the code to ensure that the battery life is sufficient for the entire life time of the lock system, which can be 20 years or more.

BRIEF DESCRIPTION OF THE DRAWINGS

In the following the invention will be described in greater detail with reference to exemplary embodiments in accordance with the accompanying drawings, in which FIG. 1 demonstrates embodiments 10 of a multi access mode lock 100 in accordance with the invention as a block diagram.

Some of the embodiments are described in the dependent claims.

DETAILED DESCRIPTION OF EMBODIMENTS

Figure 1:
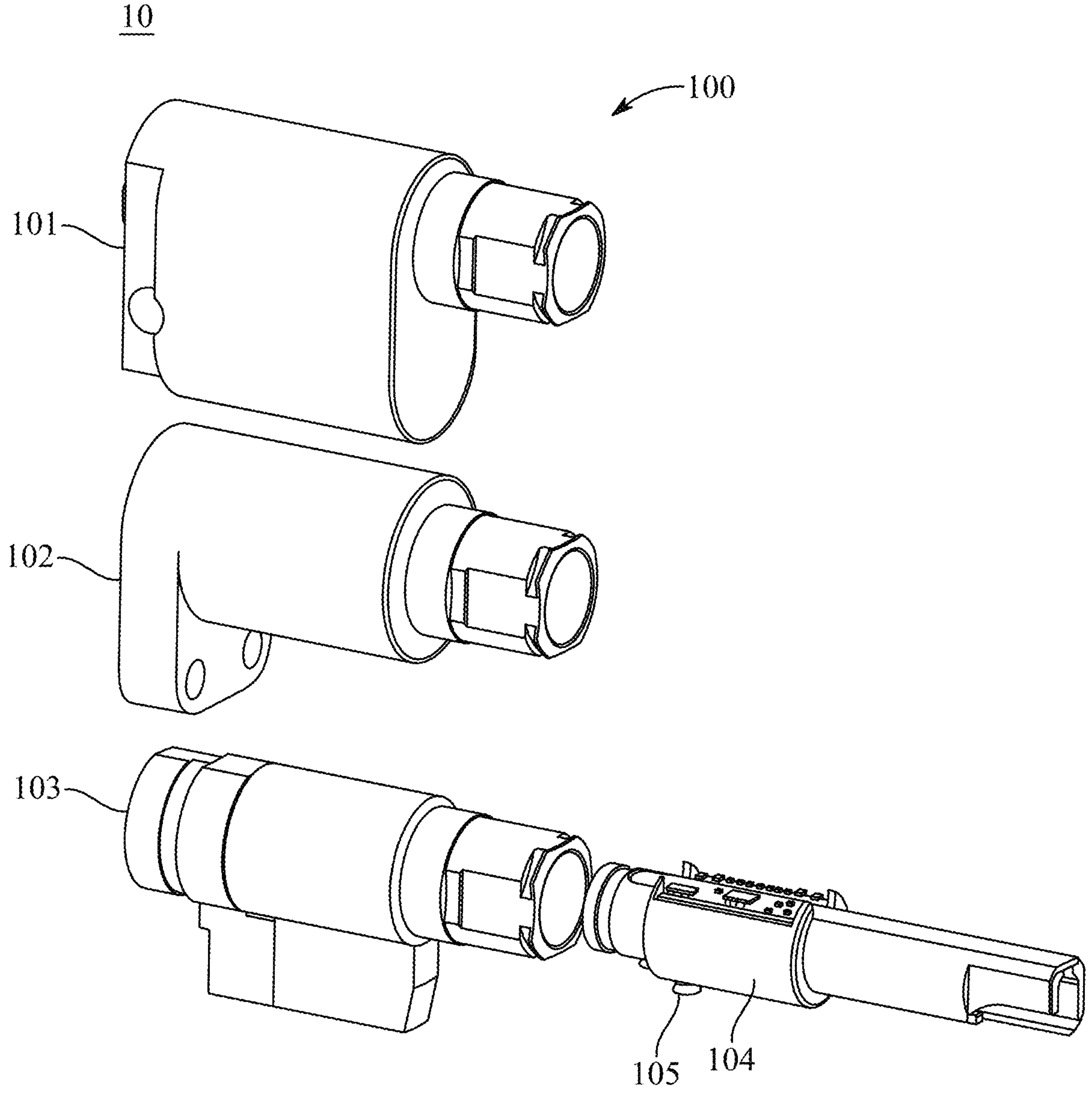

FIG. 1 shows embodiments of the lock core 104 capable of implementing the invention. These lock cores are in accordance with the following cylinder standards, Scandinavian Oval, Australian & UK Oval, Europrofile (DIN), ANSI deadbolt and Mortise (101, 102, 103). The lock core 104 typically has a latch 105, which is preferably operated by magnetic repulsion and attraction or hard and semi-hard magnets to minimise energy consumption. The mechanics of how the magnets move the latch 105 are explained for example, in the cited reference U.S. Ser. No. 11/619,069 from the applicant.

Any features of embodiment 10 may be readily combined or permuted with any of the other embodiments 20, 30, 40, 50, 60, 70, 71, 72, 80, 81, 82, 83, 84, 90, 91 and/or 92 in accordance with the invention.

Figure 2:
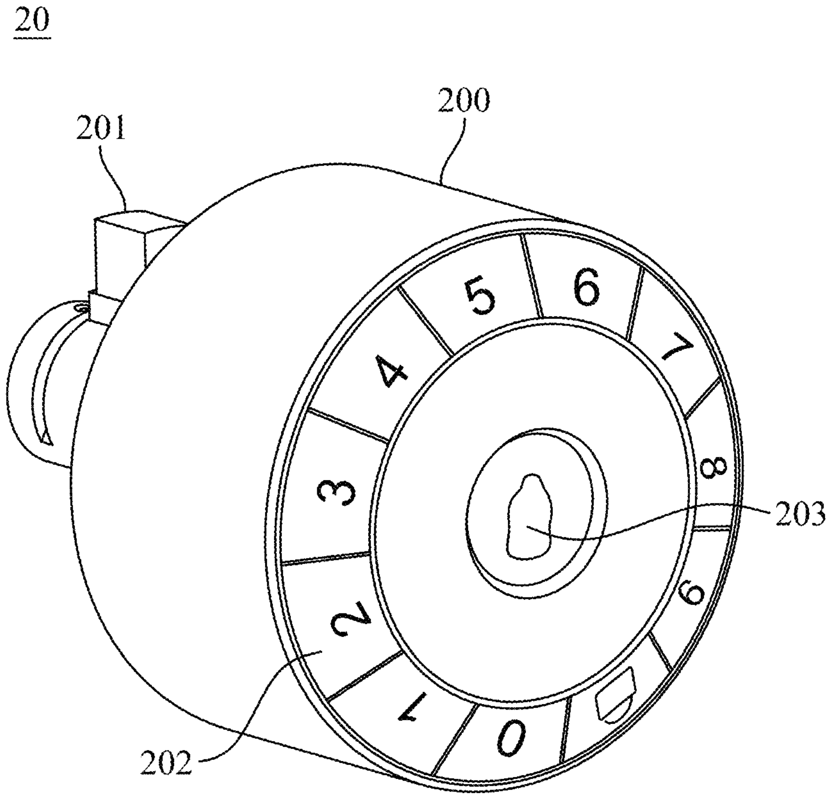
FIG. 2 demonstrates an embodiment 20 of a hybrid knob 200 of a multi access mode lock in accordance with the invention as a block diagram.

FIG. 2 shows the embodiment 20 of the multi access mode lock 200. A mechanical key can be inserted into keyhole 203, and the insertion and/or the turning of the key opens the lock. The muscle energy of the user doing the insertion and/or turning is also harnessed to power the lock in accordance with the invention. Any muscle movement, such as pushing, pulling, turning and/or compressing of the key in and out the lock can be harvested to power the lock. The key can be a traditional metal key, a key fob, a key card, a key slip or any other type of key in different embodiments of the invention.

The transceiver or receiver 201 is concealed inside the door when the multi access mode lock is installed in the door. This transceiver or receiver 201 typically is Bluetooth or NFC compliant or both. The transceiver or receiver is configured to communicate with the mobile apps of the users, and typically harness their operation power from the NFC, or the Qi charging power of the mobile phone operating the mobile app in the proximity of the lock.

In some embodiments this lock supports digital mobile keys that are stored in the Wallet app, or other similar app, of the mobile smartphone. In some embodiments the lock 200 is capable of reading tags, which might encode for example access right related information.

The number dial 202 is used to enter the numerical code. This method typically uses battery power in accordance with the invention. However, it is possible to harness the mechanical energy used in the turning of the number dial, or in the presses of the buttons to power the lock. The user typically enters the number code manually. However, the user may receive the number code from the cloud server by messaging. It should be noted that the transceiver or receiver 201 is preferably not used to communicate with the cloud server, to save power. Instead, the numerical codes are generated from digit seeds/number seeds on the cloud server and the lock, separately and individually, based on the current time. This means that both the cloud server and the lock 200 are equipped with accurate clocks. Therefore, the necessity of having a battery is determined by the need to keep the clock operating and on-time throughout the life cycle of the lock. If this can be achieved with energy harvesting, all three access modes can be self-powered.

In some preferable embodiments the lock operates as follows: The lock remains in deep sleep mode until activated. Subsequently, the number dial 202 can be activated by pressing any button. Upon activation, the LEDs in the dial 202 light up, signalling the user to insert the pin code. If the entered pin code is correct, the "lock" button on the dial 202 turns green for e.g. 2 seconds, and the knob becomes unlocked for rotation. After a specific period (e.g., 5 seconds), the knob automatically locks again, and the lock button shows red on the dial 202 for a second. After that the lock 200 goes back to deep sleep mode, preserving battery power.

Any features of embodiment 20 may be readily combined or permuted with any of the other embodiments 10, 30, 40, 50, 60, 70, 71, 72, 80, 81, 82, 83, 84, 90, 91 and/or 92 in accordance with the invention.

Figure 3:
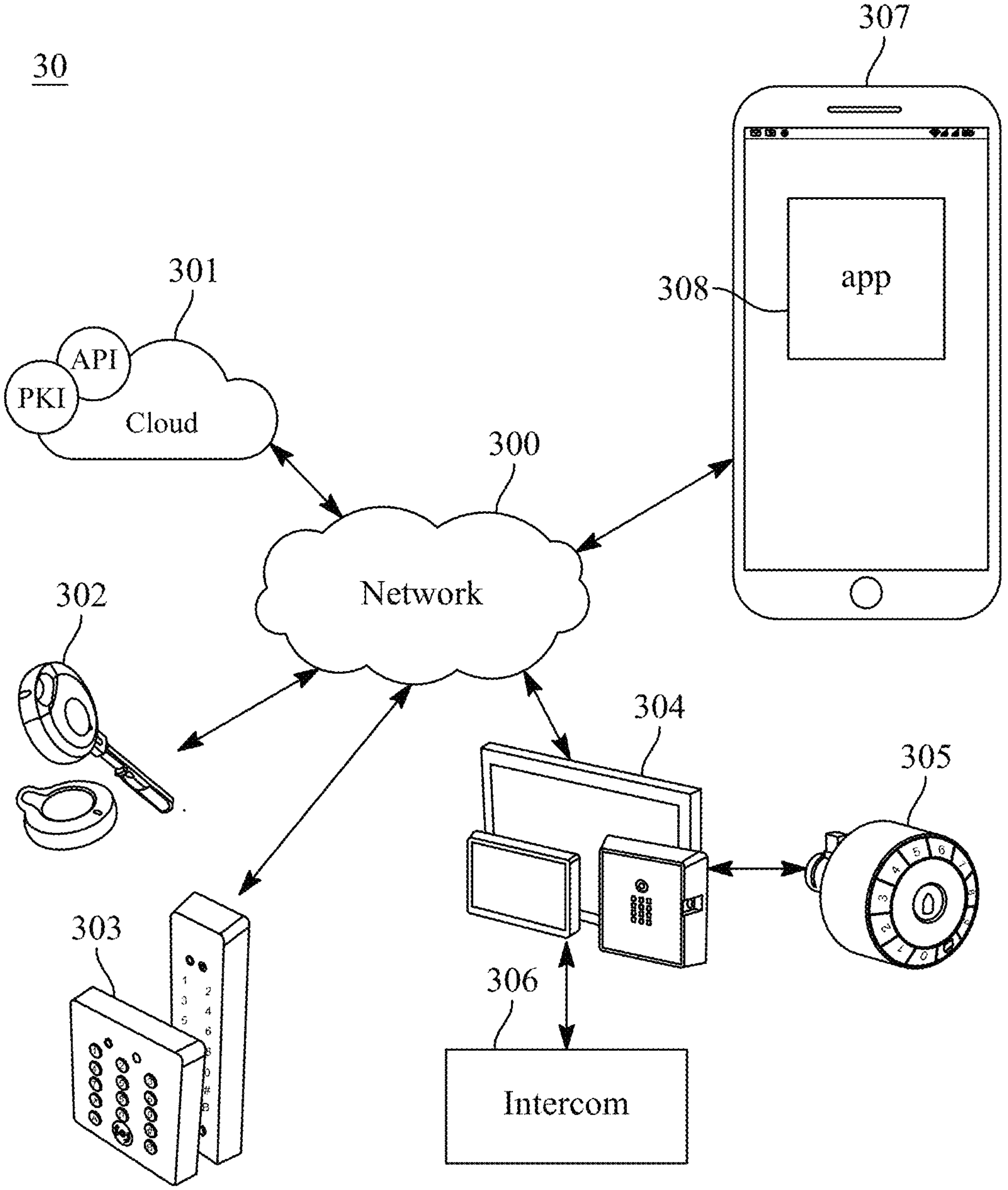
FIG. 3 demonstrates an embodiment 30 of a cloud based 300 lock system using a multi access mode lock in accordance with the invention as a block diagram.

FIG. 3 shows an embodiment 30 of the inventive system as a network diagram. The network 300 used for the communication in embodiments of the invention is the wireless or wireline Internet or the telephony network, which is typically a cellular network such as UMTS (Universal Mobile Telecommunication System), GSM (Global System for Mobile Telecommunications), GPRS (General Packet Radio Service), CDMA (Code Division Multiple Access), 3G, 4G, 5G, Wi-Fi and/or WCDMA (Wideband Code Division Multiple Access)-network.

The user terminal device 307 is in communication with the network 300 and the cloud server 301. The user terminal device 307 may be configured as a mobile terminal computer, typically a smartphone and/or a tablet that is used to receive identification information pertaining to the user. The user terminal device 307 is typically a mobile smartphone, such as iOS, Android, or a Windows Phone smartphone. However, it is also possible that the user terminal device 307 is a mobile station, mobile phone or a computer, such as a PC-computer, Apple Macintosh computer, PDA device (Personal Digital Assistant), or UMTS (Universal Mobile Telecommunication System), GSM (Global System for Mobile Telecommunications), WAP (Wireless Application Protocol), Teldesic, Inmarsat-, Iridium-, GPRS- (General Packet Radio Service), CDMA (Code Division Multiple Access), GPS (Global Positioning System), 3G, 4G, Bluetooth, WLAN (Wireless Local Area Network), Wi-Fi and/or WCDMA (Wideband Code Division Multiple Access) mobile station. Sometimes in some embodiments the user terminal device 307 is a device that has an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The user terminal device 307 provides an software application 308 to allow the user to input identification information pertaining to the user to be authenticated with the cloud server 301. Preferably the user downloads the application from the Internet, or from various app stores that are available from Google, Apple, Facebook and/or Microsoft. For example, in some embodiments an iPhone user with a Facebook application on his phone will download the application that is compatible with both the Apple and Facebook developer requirements. Similarly, a customized software application 308 can be produced for other different handsets.

The software application 308 is typically a smart living application for the residents of the properties in some embodiments. Using the application, the residents can manage the access rights to their property.

In an example, the cloud server 301 may comprise a plurality of servers. In an example implementation, the cloud server 301 may be any type of a database server, a file server, a web server, an application server, etc., configured to store identification information related to the user. In another example implementation, the cloud server 301 may comprise a plurality of databases for storing data files. The databases may be, for example, a structured query language (SQL) database, a NoSQL database such as the Microsoft® SQL Server, the Oracle® servers, the MySQL® database, etc. The cloud server 301 may be deployed in a cloud environment managed by a cloud storage service provider, and the databases may be configured as cloud-based databases implemented in the cloud environment.

The cloud server 301 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 301 of embodiments of the invention. The cloud server 301 can be purchased as a separate solution from known vendors such as Microsoft and Amazon and HP (Hewlett-Packard). The cloud server 301 typically runs Unix, Microsoft, iOS, Linux, or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage, or the like.

The cloud server 301 typically has Application Programmer Interface API and Public Key Infrastructure PKI abilities. The cloud server 301 typically hosts a management application, and provides user accounts via a portal, for example a web portal, through which the users can manage their account and their property access rights.

In operation, the user enters the identification information in the user terminal device 307. In an example, the identification information may be fingerprint, passcode, and/or personal details associated with the user. The identification information entered by the user may be through any of the following: the keypad access 303, a fingerprint scanner, and/or Near Field Communication (NFC) reader. In preferable embodiments, the identification information entered by the user is communicated to the cloud server 301 through the network 300. The cloud server 301 authenticates the entered identification information by comparing with the identification information stored in the database of the cloud server 301. A notification associated with the authentication is communicated through the network 300 and displayed on the application 308 in the user terminal device 307. In an example, the notification may be an alert indicative of success or failure of authentication. In some implementations, the notification may be any of the following: an audio notification, a video notification, a multimedia notification, and/or a text notification. If there is a mismatch of the identification information, the lock 305 is not opened through the application 308. If the identification information entered by the user matches with the identification information stored in the database of the cloud server 301, the lock 305 is opened through the application 308 in the user terminal device 307. In some embodiments the power from the user terminal device 1720 is used to power the lock 305, for example by using NFC or Qi. Similarly, the turning of the key inside the keyhole 203 of the lock 305 typically harnesses mechanical energy to power the lock 305.

However, the numerical code is typically generated without the use of self-powering methods. The cloud server 301 and the lock 305 preferably have independent number seed generators, which may be identical, and clocks. The number seed generators are used to maintain a time dependent access code that is known by both the lock 305 and the cloud server 301, without any communication or use of the network 300.

The keypad 303 may also have an Intercom, or there may be an independent Intercom 306, and/or a digital reader capable of reading e.g. QR codes or other optical information in preferable embodiments. In some embodiments the keypad 303 may understand voice, for example with artificial intelligence AI and natural language processing. For example, if a resident named Tomi shouts "It's Tomi, open the door", and the resident of the property is indeed Tomi, whose voice has been recorded on the cloud server, the voice and natural language processing of AI will recognise that Tomi is actually talking/shouting on the intercom with words that constitute a request to open the door, and the lock system can then proceed to open the door. In this embodiment the cloud server 301 would typically recognise the voice of Tomi, the resident. Alternatively, a picture of Tomi could be taken with a camera, or other face scan, and the resident Tomi could be recognised by his facial appearance using AI and image recognition, thereby granting Tomi access to his property by opening one or more locks. Other biometric authentication methods are also possible and in accordance with the invention.

The physical key 302 or key fob may be connected to the cloud network 300 in some embodiments. For example, an Air Tag (by Apple) type of locating solution can be used to keep track of the locations of the key 302 or key fob in some embodiments of the invention. In some embodiments, the physical key or key fob 302 is configured to be operable with Self-powered, NFC-powered, and ultra-low power digital locks with strong identification and device-to-device communication.

In some embodiments the locking infrastructure of the invention also comprises information screens and key automats. These are useful for fluent and efficient information sharing, booking, building and access service management.

Any features of embodiment 30 may be readily combined or permuted with any of the other embodiments 10, 20, 40, 50, 60, 70, 71, 72, 80, 81, 82, 83, 84, 90, 91 and/or 92 in accordance with the invention.

Figure 4:
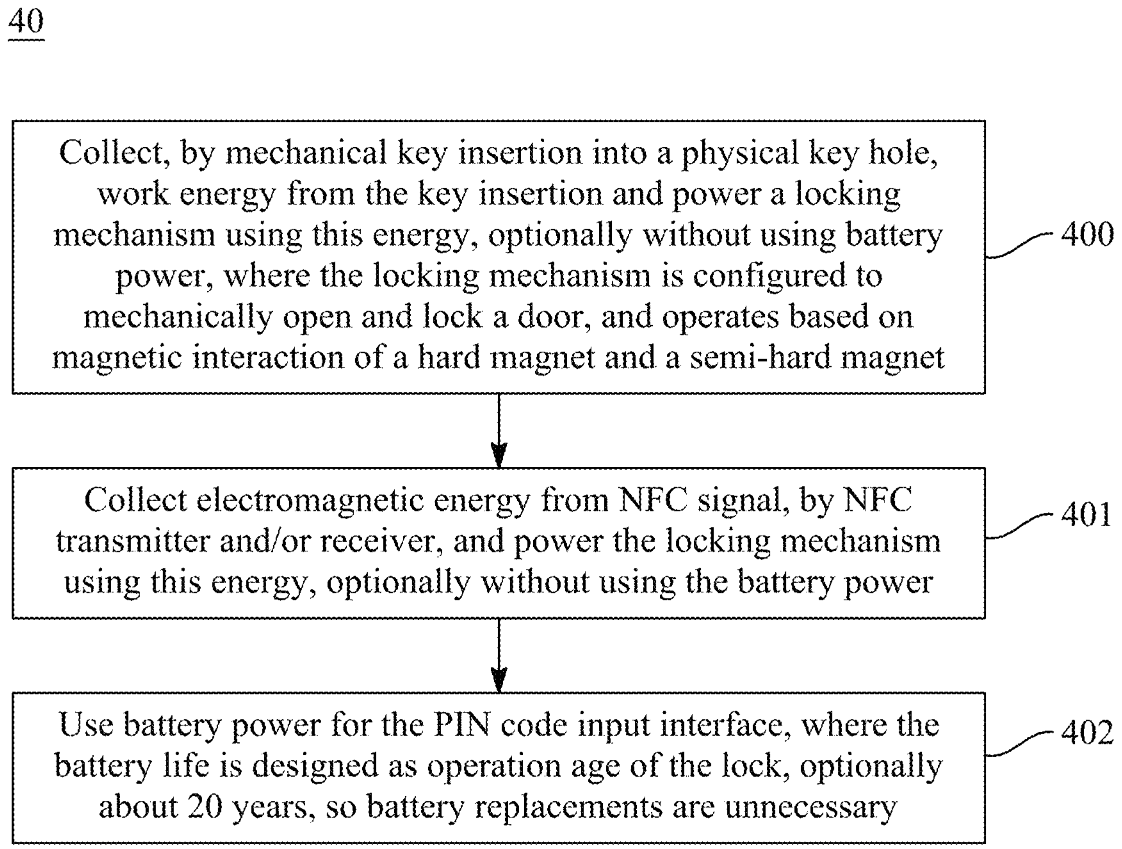
FIG. 4 demonstrates an embodiment 40 of operating a multi access mode lock 100, 200 in accordance with the invention as a flow diagram.

FIG. 4 shows a basic embodiment 40 of the operation method of the inventive multi access mode lock 200, 305.

In phase 400 the mechanical key 302 enters the keyhole. The work energy produced by the muscle power of the person holding the key in his hand, and the insertion and/or turning of the key is translated to electrical energy in the lock 305. This electric energy is typically used to operate a magnetic system comprising a semi-hard magnet and a hard magnet. For example, the energisation of the coil around a magnet (mentioned in U.S. Ser. No. 11/619,069) can be used to mechanically move the other magnet by magnetic repulsion or attraction. The moving magnet could be made the latch, or the mechanical motion of the magnet could be coupled to the latch 105, and make the lock core 104 close or open the lock 305.

In phase 401 electromagnetic energy is collected from the NFC signal, or from a Qi wireless charging signal arising from a mobile phone in proximity. This electromagnetic energy is used to power the opening or closing of lock 305, for example by energisation of the coil as explained in phase 400. The NFC communication signal carries the authenticating information or the digital key, which is checked to determine whether the lock can be opened or not. The entry of the authenticating credentials via NFC, or via Bluetooth, therefore does not consume battery power of the lock 305 in phase 401.

In phase 402 a pin code that has been previously generated by the cloud server is entered using the pin code input interface 203, 305. Now the battery power of the lock is used to generate the number against which the inputted number is checked in the lock 305, 200. If the user enters the correct pin number, the lock is opened. And battery power will be used. As phase 402 rarely occurs, because phases 401 and 402 are likely to occur more often and first, the consumption of the battery of the lock is quite minimal in typical use. Different usage of access modes will of course typically lead to different battery power use over time.

Any features of embodiment 40 may be readily combined or permuted with any of the other embodiments 10, 20, 30, 50, 60, 70, 71, 72, 80, 81, 82, 83, 84, 90, 91 and/or 92 in accordance with the invention.

Figure 5:
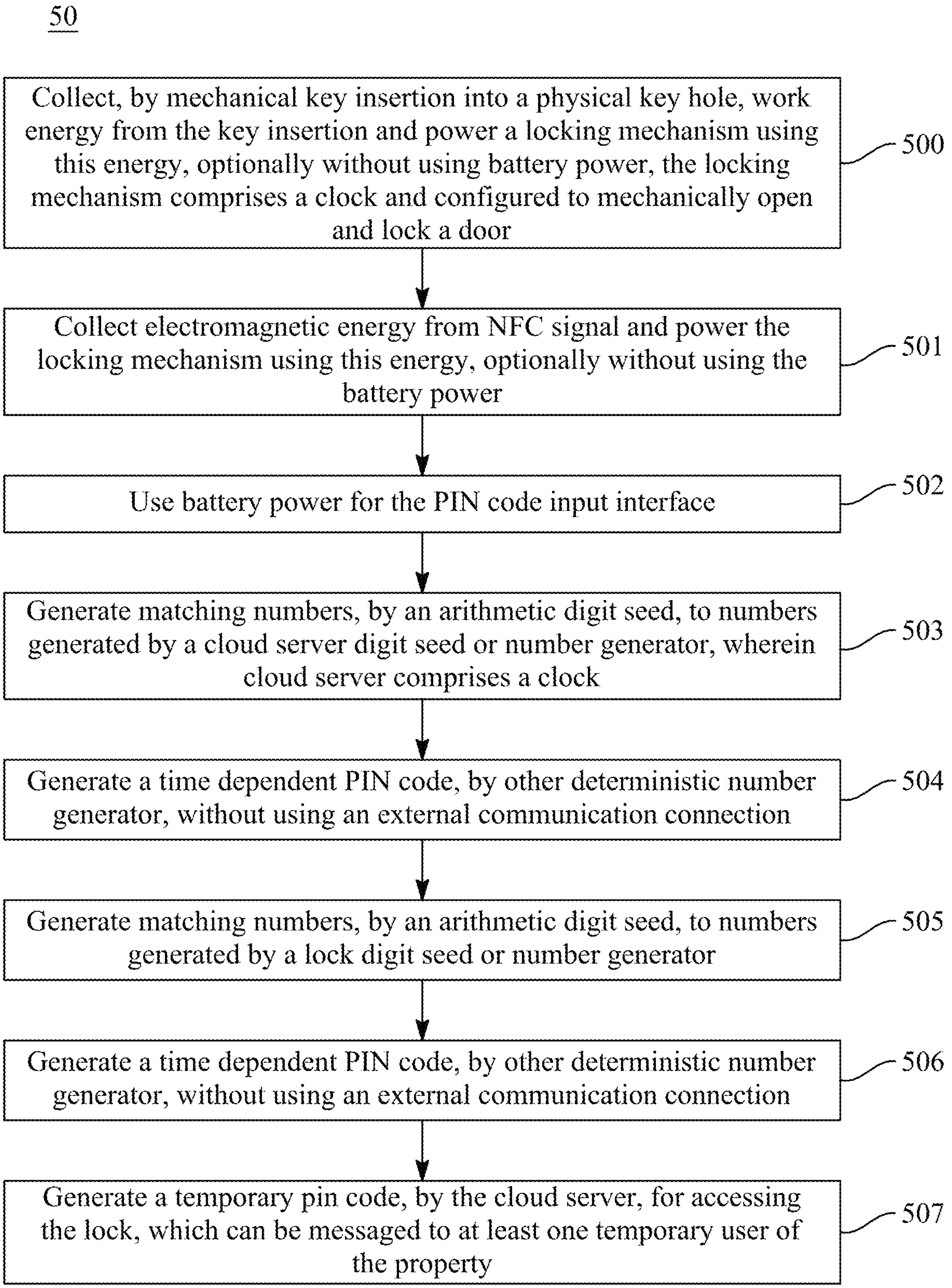
FIG. 5 demonstrates an embodiment 50 of operating a cloud based multi access mode lock 100, 200 in accordance with the invention as a flow diagram.

FIG. 5 displays a more elaborate embodiment 50 of the operation method of the lock system as a flow diagram. In phase 500 all or some of the operation power of the lock 200, 305 is collected from key insertion. In phase 501 electromagnetic energy required to operate the lock is collected from NFC signal which carries the digital key. In phase 502 these access methods are no longer used, and instead a PIN code or number code is used. Battery power of the lock 305 is on standby or is used to power the PIN code input interface used to enter the PIN code.

In phase 503 matching numbers or a number pair are generated with an arithmetic seed at the cloud server digit seed or number generator, and the cloud server 301 comprises a clock, or has access to a clock, for example satellite time or the like.

In phase 504 a time dependent PIN code is generated at the cloud server 301, with a deterministic number generator. This means that knowing the precise time, and using it as an input, the number generator will generate an arithmetic number that is unique and deterministic (only that precise number can be generated at that time), but it is exceedingly difficult to guess this number beforehand, without having or knowing the algorithm of the deterministic number generator.

In phase 505 matching numbers are generated by an arithmetic digit seed, to numbers generated by a lock 200, 305 digit seed or number generator. The arithmetic digit seed might be identical to the digit seed of phase 503. However, in some embodiments the digit seeds at the lock 200, 305 and the cloud server 301 might be different, as long as the PIN codes generated by each of them can be uniquely and identically defined. The lock 200, 305, also comprises a clock.

In phase 506, a time dependent PIN code is generated using a deterministic number generator at the lock 200, 305, without forming a communication connection to the cloud server 301. This time dependent PIN code will be identical to the PIN code generated at the cloud server 301 in phase 503, when the time or time interval is the same.

In phase 507 the cloud server 301 generated PIN code can be messaged to a user of a property needing to open the lock and access the property. This PIN code will match the PIN code generated independently by the lock 200, 305 of the property at the same given time or time interval. Therefore, the temporary user may obtain access to the property by opening the lock 200, 305 by entering the PIN code obtained from the message.

There is no communication connection between the lock 200, 305 and the cloud server 301 in this embodiment. Thereby the operation power used by the lock 200, 305 is kept very low, thus preserving battery power in the lock 200, 305.

Any features of embodiment 50 may be readily combined or permuted with any of the other embodiments 10, 20, 30, 40, 60, 70, 71, 72, 80, 81, 82, 83, 84, 90, 91 and/or 92 in accordance with the invention.

Figure 6:
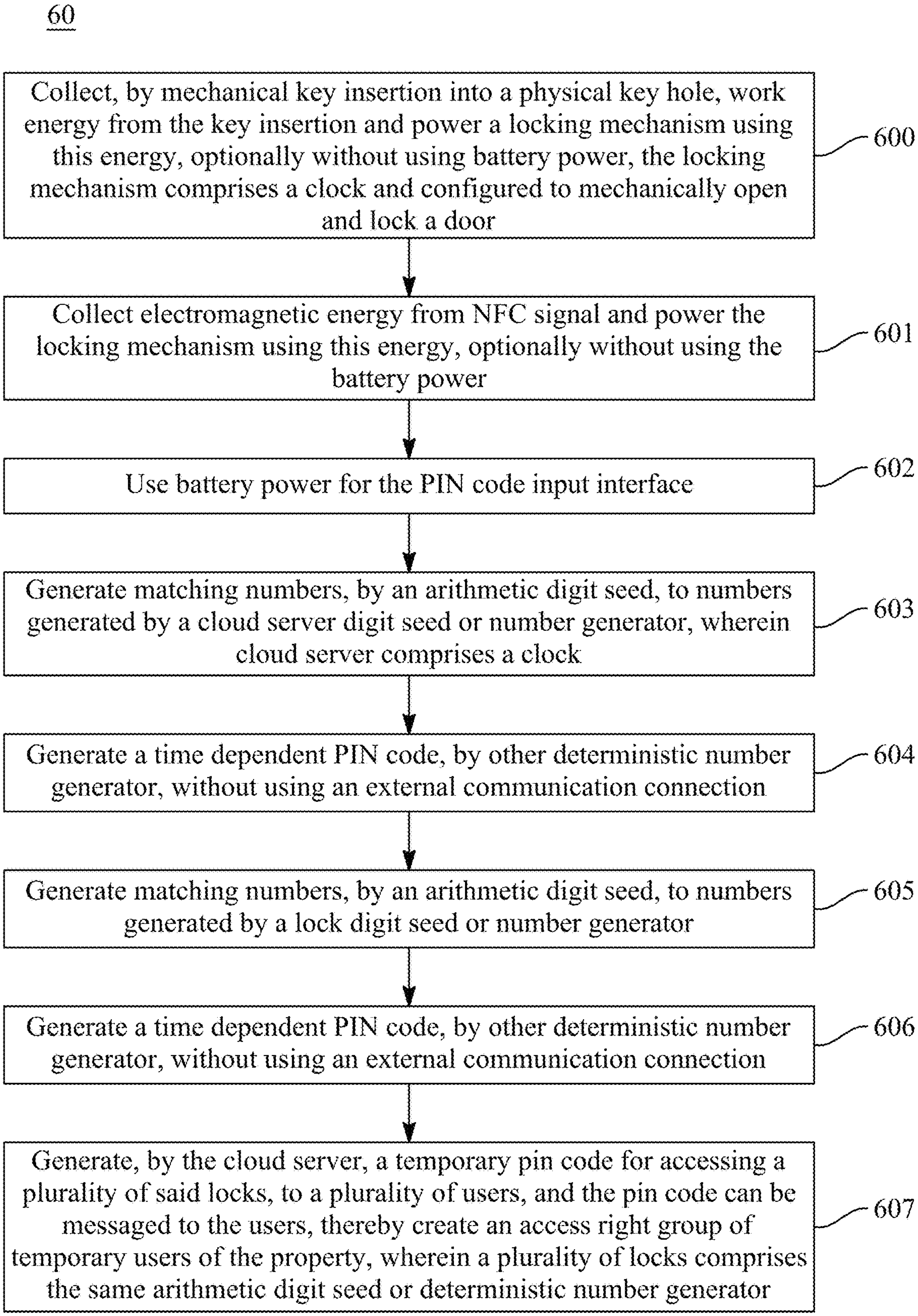
FIG. 6 demonstrates an embodiment 60 of operating a cloud based multi access mode lock 100, 200 in accordance with the invention as a flow diagram for creating an access right group for a system of multiple locks.

FIG. 6 shows a more elaborate embodiment 60 of the operation of the inventive lock system with a plurality of locks securing multiple rooms or buildings, and accessed by multiple users.

In phase 600 the mechanical energy of the key insertion is harnessed to power the lock system. In phase 601 the energy needed to operate the lock is collected from the NFC signal bearing the digital key used to open the lock 200, 305. Stated differently, it is the NFC enabled mobile phone or other NFC device that powers the lock, or this lock opening. If the mobile phone of the user is brought near the lock 200, 305, in some embodiments also the wireless charging Qi from the mobile phone could be used to power the lock 200, 305. This would require discharging power from the mobile phone instead of charging the mobile phone. Phases 600, 601 typically do not consume battery power of the lock 200, 305.

In phase 602 battery power is used, or battery power is on standby, for the PIN code input interface. In phase 603 matching numbers are generated on the cloud server 301 by an arithmetic digit seed. These numbers match the numbers that the cloud server 301 digit seed or number generator generates by using the time of the clock of the cloud server 301 as an input, in the server-based number generation process.

In phase 604 a time dependent PIN code is generated by another deterministic number generator, or the same number generator as in phase 603, at the cloud server 301.

In phase 605 matching numbers are generated at the lock 200, 305. These numbers are generated using an arithmetic digit seed to match numbers resulting from the lock digit seed or a number generator in the lock 200, 305. The digit seeds or the number generators in the lock 200, 305 and the cloud server 301 can be identical in some embodiments. However, in some embodiments the digit seeds or number generators are different on the cloud server 301 and the lock 200, 305, but are designed to produce a unique, identical outcome with time as an input.

In phase 606 the lock 100, 305 generates a time dependent PIN code that matches the PIN code generated in phase 604 by the cloud server 301.

In phase 607 the cloud server 301 generates a temporary pin code accessing a plurality of locks 200, 305. All separate locks 200, 305 individually generate the same PIN code individually. This PIN code can be messaged to a plurality of users, thereby creating an access right group of temporary users of the property. Typically, each of the locks 200, 305 comprises the same arithmetic digit seed or deterministic number generator. In some embodiments an identical digit seed or deterministic number generator resides also on the cloud server 301.

In some embodiments the cloud server 301 can generate a plurality of access codes, which each open the plurality of locks 200, 305. A different individual access code can then be sent to each user. The locks 200, 305 need to generate a set of access codes in this embodiment, so that the locks 200, 305 can let different users open a particular lock with different access codes.

Any features of embodiment 60 may be readily combined or permuted with any of the other embodiments 10, 20, 30, 40, 50, 70, 71, 72, 80, 81, 82, 83, 84, 90, 91 and/or 92 in accordance with the invention.

Figure 7A:
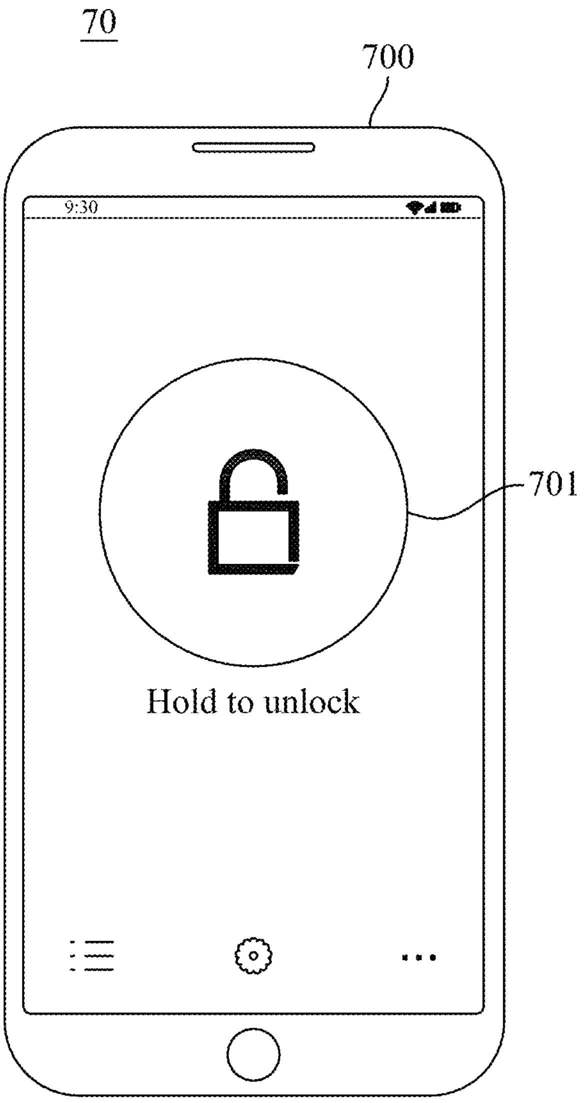
FIG. 7A demonstrates an embodiment 70 of operating a cloud based multi access mode lock 100, 200 with a mobile application in accordance with the invention as a user interface diagram.

FIG. 7A shows an embodiment of a user interface diagram of the mobile application 308 in accordance with the invention. The access to the mobile application 308 is controlled by a screen lock 701, which is typically set by the operating system of the mobile phone 700. A personal access code is typed to the field 701 when requested by the operating system of the mobile phone 700. This is the code required by the OS, and it is preferably not the lock code. Alternatively, the user may be recognised by means of a fingerprint or facial scan, or some other biometric method. Once it has been established that the correct person is using the smartphone 700, the first menu of the mobile application 308 is viewed on the screen of the smartphone 700, in embodiment 71, FIG. 7B.

Figure 7B:
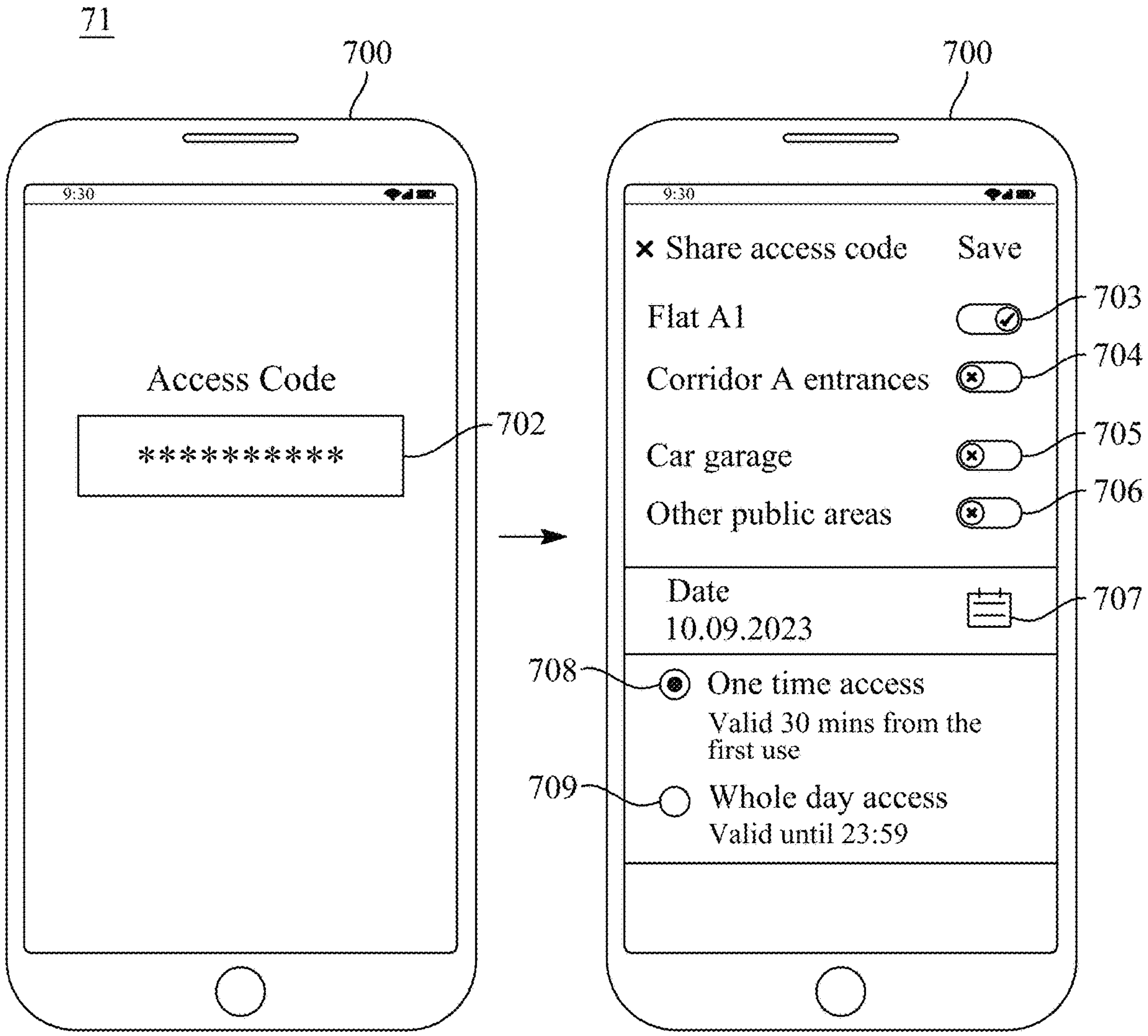
FIG. 7B demonstrates an embodiment 71 of operating a plurality of cloud based multi access mode locks 100, 200 with a mobile application in accordance with the invention as a user interface diagram.

FIG. 7B shows an embodiment 71 of using the mobile application 308. Here, the opening of the lock or locks 200, 305 is invoked by means of the numerical code. The cloud server 301 is sending the numerical code to the mobile application 308, and in this embodiment, there are 10 digits in the numerical code. However, in some embodiments it is preferable that the mobile application 308 conceals the access code as ********-string, so that it is not accidentally viewed by strangers overlooking the shoulder of the user. There is typically a separate toggle for viewing the numerical code. When the numerical code is entered into the mobile application 308 field 702**, the keypresses are typically also concealed.

In the screenshot, on the right-hand side toggles 703, 704, 705, 706 are shown which control the sharing of the access code. These toggles cause the selection of locks 200, 305 and property spaces that are opened by the access code being generated. Here only the door of Flat A1 is included. Toggles 707, 708, 709 define the time interval when the access code works. Here a 30-minute interval from first use on 10 Sep. 2023 is selected. This code can now be shared by messaging with a person who needs to enter the Flat A1 on 10 Sep. 2023 for 30 minutes. The code is generated by the cloud server 301, communicated to the locking application or messaging inbox of the recipient, and the numerical code is selected so that it matches a code generated in the Flat A1 lock, by the arithmetic digit seed, on 10 Sep. 2023. In some embodiments of the invention, it is advantageous to not reveal the code to the user of the mobile station 700.

Figure 7C:
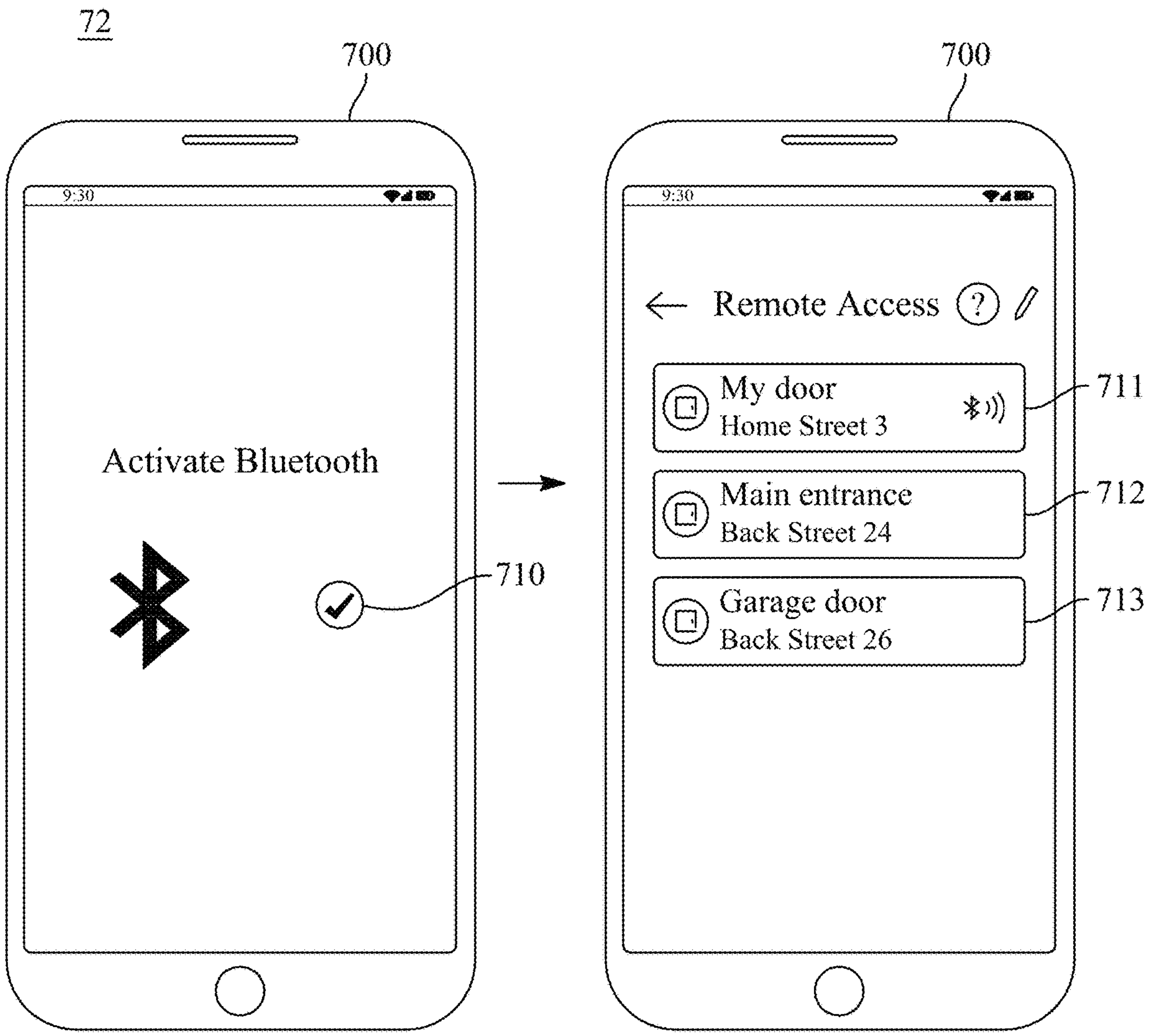
FIG. 7C demonstrates an embodiment 72 of operating a plurality of cloud based multi access mode locks 100, 200 with a mobile application by remote in accordance with the invention as a user interface diagram.

In FIG. 7C an embodiment 72 demonstrating the remote opening of the lock is shown as a screen shot diagram. First in toggle 710 the Bluetooth connection is activated at the mobile phone 700. Preferably the connection is Bluetooth Low Energy BLE, to conserve power. The menu on the right-hand side lists doors controlled by the user: My door 711, Main entrance 712 and Garage door 713. Provided these doors are in range of the Bluetooth connection, the user may open these doors remotely, for example by pressing the icon 711, 712, 713 on the touch sensitive display. For example, the user may press the icon 713 while sitting in his car in the curb or driveway, and the Garage door can be opened automatically, without the user needing to leave his car, so the user can drive the car directly into the garage.

Any features of embodiments 70, 71, 72 may be readily combined or permuted with any of the other embodiments 10, 20, 30, 40, 50, 60, 80, 81, 82, 83, 84, 90, 91 and/or 92 in accordance with the invention.

Figure 8A:
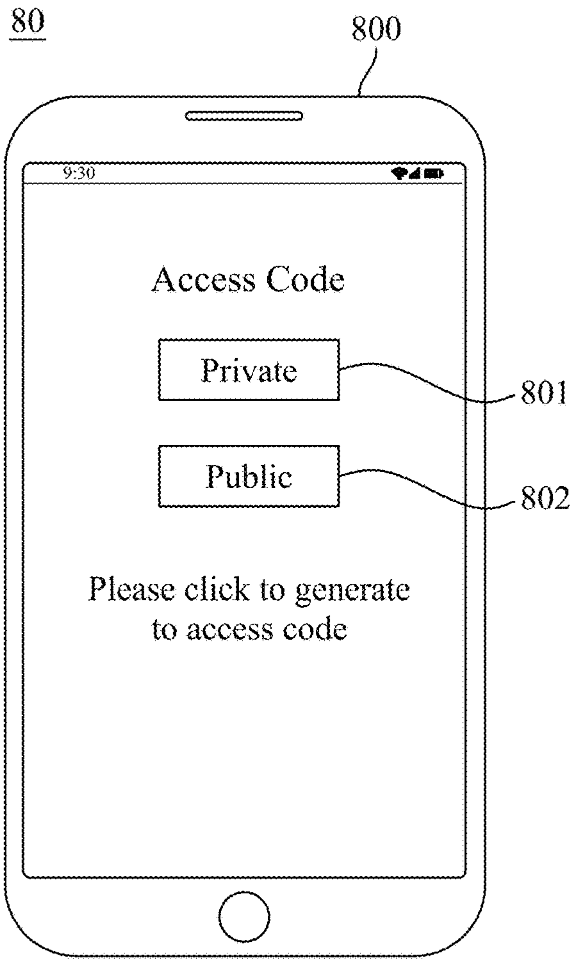
FIG. 8A demonstrates an embodiment 80 of operating a cloud based multi access mode lock 100, 200 with a mobile application handling private and public access codes in accordance with the invention as a user interface diagram.

FIG. 8A displays an embodiment 80 for generating an access code. The user may select between a private access code 801, or a public access code 802, by pressing the touch screen icon on the screen of the mobile device 800.

In some embodiments of the invention the access code types are allocated as follows: Private access codes are allocated for Private common area use. A user selects icon 801 to create a code of this type.

Visitor access codes are for visitors and are public. The user selects icon 802 to create a code of this type.

Typically, changes to visitor access code are made when creating and sharing the visitor access code. The User can select to which doors the access code works. Preferably, the shareable doors are on-line, and the doors equipped with this feature are defined in the cloud server 301 management software portal. When sharing an access code, the user can add free text in some preferable embodiments. This text can then show in an audit of the access history of the property. Preferably the access history of the property is stored on the cloud server 301. Additionally, some embodiments of the invention comprise the new Access code type: the space access code. This is for own use, min. 6-digit code that works only to this defined space. To keep this space access code secured, a separate private access code is used with common doors.

Figure 8B:
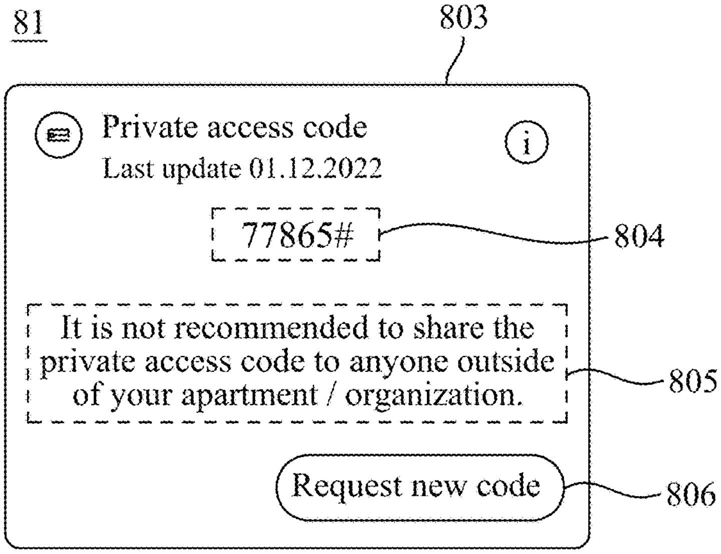
FIG. 8B demonstrates an embodiment 81 of operating a cloud based multi access mode lock 100, 200 with a mobile application handling a private access code in accordance with the invention as a user interface diagram.

FIG. 8B displays an embodiment 81 of the recipient screen displaying a private access code to a user of the screen 803. The text field 804 discloses the access code 77865 # to the user. This is the access code, to which both the lock 305 and the cloud server 301 independently need to end up at, on 1 Dec. 2022, as evidenced by the time stamp on the top of the screen 803. Screen section 805 provides a warning to the user, to the effect that the access code is private, and not meant for sharing. By pressing icon 806 the user may request a new access code, which is generated using the time when the request is made, or another future time, if the new code is requested for a specific time period in the future.

Figure 8C:
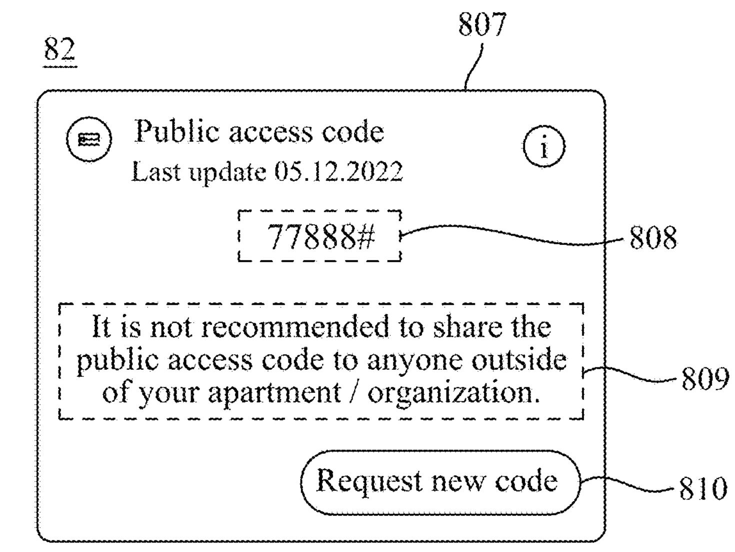
FIG. 8C demonstrates an embodiment 82 of operating a cloud based multi access mode lock 100, 200 with a mobile application handling a public access code in accordance with the invention as a user interface diagram.

FIG. 8C displays an embodiment 82 where instead a public access code is used. The public access code is generated using the time 5.12.2022 as shown on the top of the screen 807. It is disclosed in the message screen section 808 that the access code is 77888 #. This code should be independently generated by both the cloud server 301 and the lock 305, using the time 5 Dec. 2022. Even though the access code is public, it's sharing outside the apartment or organization is discouraged, as shown to the user in screen section 809. By pressing the icon 810 the user may request a new code, which in preferable embodiments is either private or public.

Figure 8D:
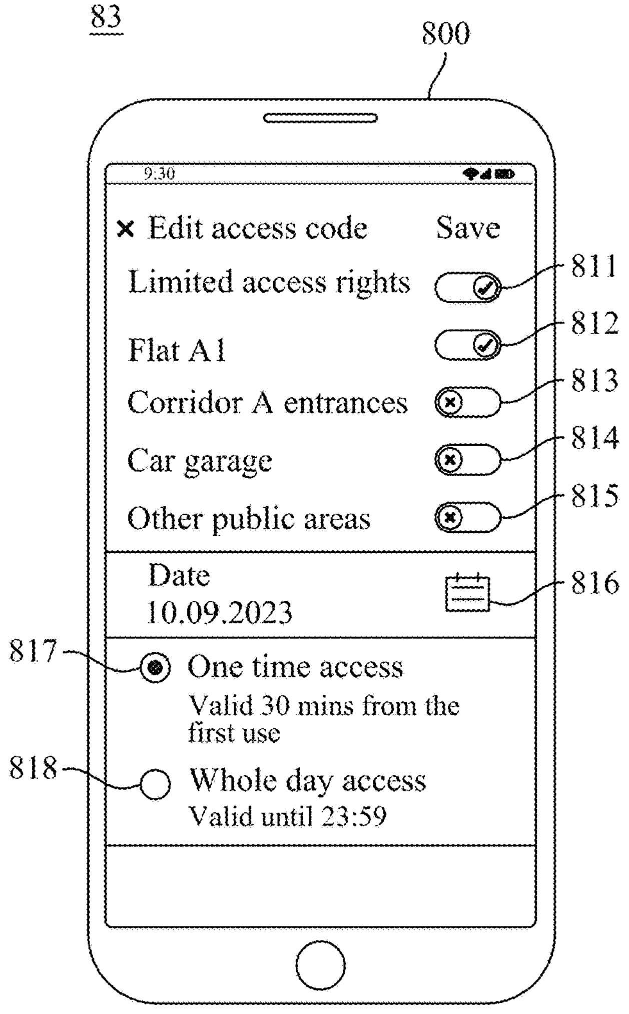
FIG. 8D demonstrates an embodiment 83 of operating multiple cloud based multi access mode locks 100, 200 with a mobile application, handling limited access rights to different areas in accordance with the invention as a user interface diagram.

FIG. 8D displays an embodiment 83 for editing access codes in the lock system. By using the toggle 811 the user can activate the limited access right for the access code, limiting the access to the property in both space and time. Here the user prohibits entrance to Corridor A entrances, the Car garage, and other public areas, by inactivating toggles 813, 814, 815. Similarly, access time is controlled too by electing a one-time access of only 30 minutes, using toggle 818. This will generate a private space access code of the type shown in FIG. 8E. It will also necessitate a different code to be used for Corridor A entrances, the Car garage, and other public areas. This way the user can move in the property without any keys at all, relying on the two codes: the public area code that is the same for all residents and the private space access code he has created for himself. This embodiment is very useful for the inadvertent situation that the user forgets the physical key and the smartphone into the Flat A1.

Figure 8E:
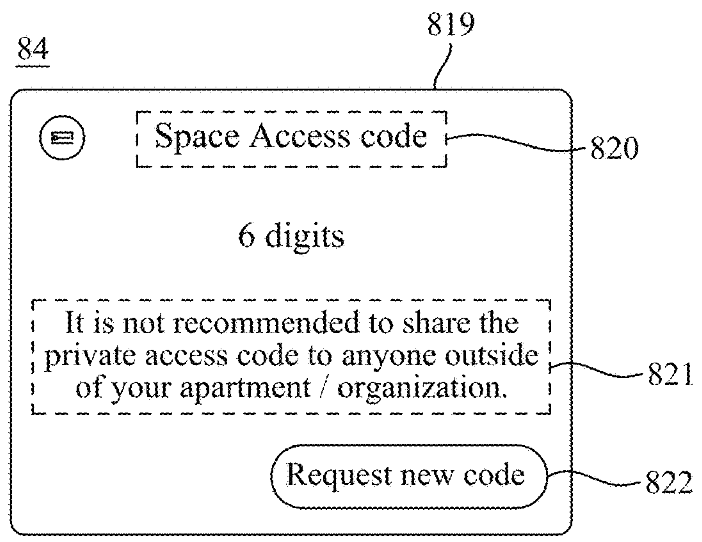
FIG. 8E demonstrates an embodiment 84 of operating a cloud based multi access mode lock 100, 200 with a mobile application handling an access code in accordance with the invention as a user interface diagram.

FIG. 8E communicates the space access code to Flat A1 that will by necessity not work in the public spaces Corridor A entrances, the Car garage, and other public areas, and will not work after 30 minutes from the first opening of the lock.

In some embodiments of the invention, the system creates an access code that works on selected day and time period after first use, and the access code works in selected doors. Preferably, the user gets a notification when visitor access code is used in On-line doors. Also preferably, Visitor Access code is sent on-line only after user has created/shared the access code to eliminate numerous access codes active in Online doors all the time for security reasons.

In preferred embodiments, the Audit of the lock is updated via device-to-device later, when space user opens the lock with the mobile application. Or when a physical key of the space is used in an on-line reader or updated with a mobile application. In some embodiments the mobile application 308 requires the digital key of the property to perform any of the mentioned audit data actions.

Typically, visitor access code types are: One time access (valid for 30 mins after first use) or Whole day access (valid until 23:59). The user can usually select the duration to be any other length too. The Access code length is 6-8 characters typically. Preferably, there is a limited number of each code type available, for example 2-3 per day.

In some embodiments of the invention, the access codes are generated per lock serial number. In other embodiments the access code per access right (single or group) is coded into the access codes.

Any features of embodiments 80, 82, 83, 84 may be readily combined or permuted with any of the other embodiments 10, 20, 30, 40, 50, 60, 70, 71, 72, 90, 91 and/or 92 in accordance with the invention.

Figure 9A:
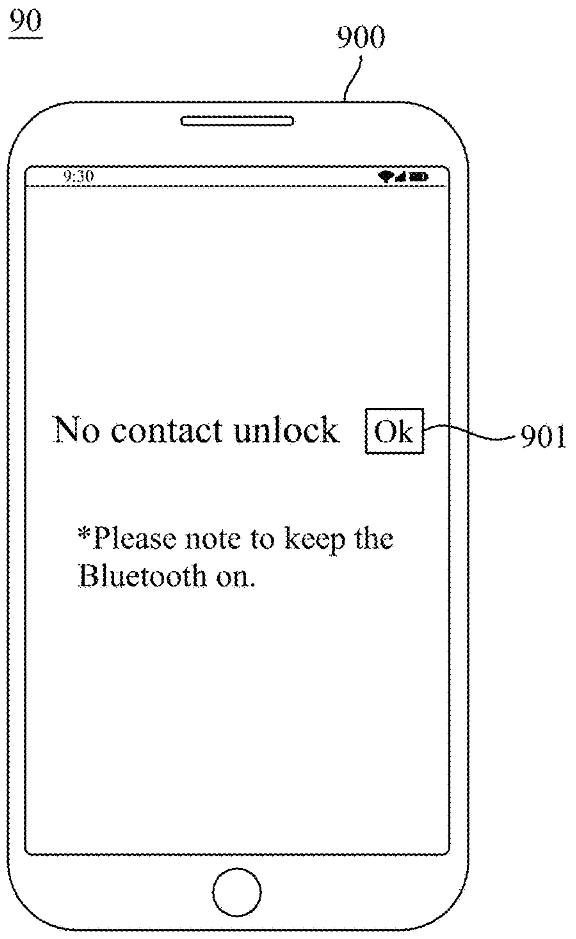
FIG. 9A demonstrates an embodiment 90 of operating a cloud based multi access mode lock 100, 200 with a mobile application by remote in accordance with the invention as a user interface diagram.

FIG. 9A discloses an embodiment 90 where the access to the lock 200, 305 is attempted via Bluetooth to open the lock from a distance of typically 1-100 m. The first screen shot demonstrates a situation where no locks can be contacted from the mobile application. The user can move past this by clicking Ok by pressing the icon 901. The screen also advises the user to keep the Bluetooth on. Preferably Bluetooth Low Energy is used.

Using the inventive lock 200, 305 via Bluetooth has benefits. One advantage is that unlocking of the lock/knob can be done from a distance, with no need to insert a physical key or show the mobile phone (the digital phone key) to the knob or lock 200, 305.

In some embodiments of the invention manual turning of the knob is still needed, when entering and leaving the property, so that the door does not swing open accidentally. In some embodiments of the invention, there is an auto closing feature, automatically closing the lock 200, 305 when the Bluetooth signal goes too far from the lock 200, 305.

In some preferred embodiments of the invention, there is the possibility to check if the lock 200, 305 was left open and do the locking remotely.

Figure 9B:
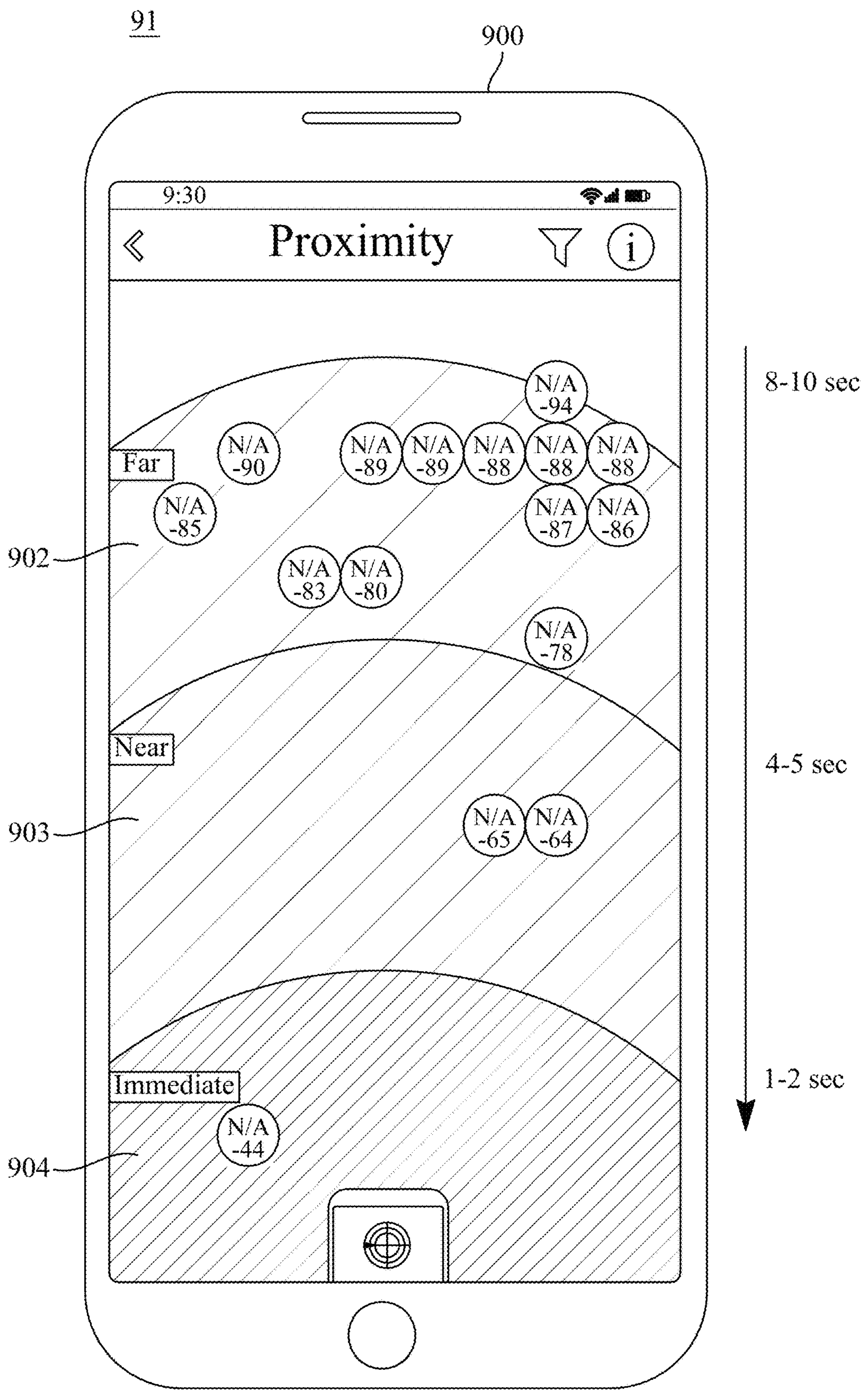
FIG. 9B demonstrates an embodiment 91 of operating a plurality of cloud based multi access mode locks 100, 200 with a mobile application by remote in accordance with the invention as a user interface diagram.

FIG. 9B shows an embodiment 91 of the invention with a screenshot of the mobile application 308 where the Bluetooth is on, and there are multiple locks 200, 305 nearby in different proximity areas 904, 903, 902. In this embodiment the proximity area 904 has a 1-2 second time distance of walking, the proximity area 903 has a 4-5 second time distance of walking, and the proximity area 902 has an 8-10 second time distance of walking.

The user can open a lock 200, 305 by simply tapping the lock icon from the screen. A digital key or the generated & received access code will then be communicated via Bluetooth to open the selected lock, and battery power of the lock 200, 305 will be used to power the lock for the opening procedure.

In some embodiments of the invention the unlocking of a lock will take place by pressing button from the mobile application 308, when coming to Bluetooth range, and the unlocking is done by pressing the icon in the mobile application 308. Preferably, there is also an Auto Unlocking mode that can be selected. This works so that when the user is in close vicinity of the lock 200, 305, and when the user has a certain level of RSSI (Received Signal Strength Indicator) reached in his mobile application 308, the lock 200, 305 is unlocked automatically. This allows the user to walk on the premises with the mobile phone 900 in his pocket and enjoy the automatic opening of all locked doors he is authorised to access.

In some embodiments the following parameter considerations are used to tune the inventive locking system to work in the optimum way:

Power Consumption: Shorter Bluetooth advertising intervals consume more power,

Latency: Longer Bluetooth advertising intervals increase discovery time, Advertising Interval Standard limits are typically 20 ms to 10.24 seconds.

Preferably, the Proximity-Based locking system of embodiments of the invention uses RSSI or other triggers to shorten the Bluetooth advertising interval when a paired device is nearby. It is also possible to use a Real-Time Clock (RTC) to set longer Bluetooth Advertising intervals at night and shorter during the day. Also, when Bluetooth locks are in vicinity without a change to RSSI it is possible in some embodiments to automatically prolong the Bluetooth advertising interval back to 8-10 sec, provided the Bluetooth component allows the dynamic adjusting of this component. This will have an advantage in night times, or daytime when the home is empty etc. When there is need for sudden use, one can activate BLE from a lock button in some embodiments.

Figure 9C:
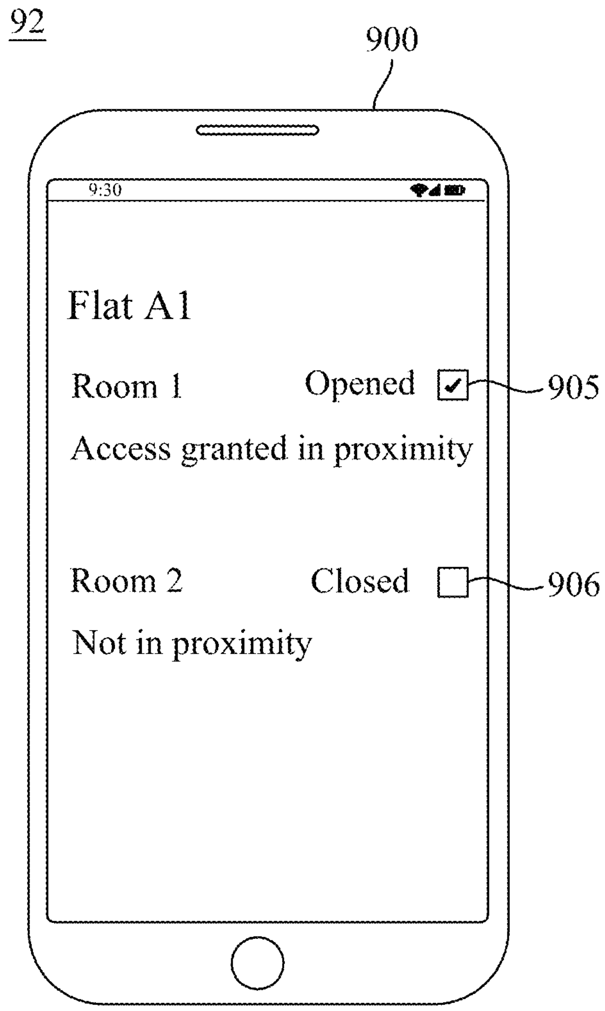
FIG. 9C demonstrates an embodiment 92 of operating a cloud based multi access mode lock 100, 200 with a mobile application by remote in accordance with the invention as a user interface diagram.

FIG. 9C displays the Bluetooth menus in Flat A1 in embodiment 92. The lock of Room 1 has been opened and the lock of room 1 is within Bluetooth range. However, Room 2 appears to be closed based on past data, and the lock of Room 2 is not connected to the mobile device 900 via Bluetooth. In some embodiments the current Bluetooth advertising interval is displayed in the mobile application 308, and it is possible to adjust this interval from the mobile application 308.

Any features of embodiments 90, 91, 92 may be readily combined or permuted with any of the other embodiments 10, 20, 30, 40, 50, 60, 70, 71, 72, 80, 81, 82, 83 and/or 84 in accordance with the invention.

The invention has been explained above with reference to the aforementioned embodiments, and several commercial and industrial advantages have been demonstrated. The methods and arrangements of embodiments of the invention allow a lock system that has a plurality of different access modes. The self-powered access modes used by the regular users consume almost no energy, as the power is generated by the use itself. The numerical access code generation requires some power, but this use is interleaved with the self-powered use of the lock 200, 305. The synergistic advantage in the combination is that the lock 200, 305 can experience very transient use with very different access modes, but the lock system can still be designed so that it requires no maintenance, or almost no maintenance over the lifetime of the lock system, which lock lifetime is typically 20 years.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

U.S. Ser. No. 11/566,446B2, Digital Lock, iLOQ Oy, Mika Pukari.
U.S. Ser. No. 11/619,069, Electromagnetic Actuator, iLOQ Oy, Mika Pukari.
JP2014190122, ELECTRIC LOCK DEVICE, PROGRAM, METHOD FOR UNLOCKING ELECTRIC LOCK DEVICE, AND ELECTRIC LOCK SYSTEM, Miwa Lock, Furukawa & Kamoya.

The invention claimed is:

1. A multi access mode lock system, comprising:
- a locking mechanism configured to mechanically open and lock a door;
- a PIN code input interface;
- a physical keyhole;
- an NFC transmitter and/or receiver, configured to accept a key via NFC; and
- a battery, wherein,
  - a mechanical key insertion into the physical keyhole is configured to collect work energy from the key insertion and power the locking mechanism using this energy, without using the battery power,
  - the NFC transmitter and/or receiver is configured to collect A electromagnetic energy from an NFC signal and power the locking mechanism using this energy, without using the battery power, and
  - only the PIN code input interface and an access mode using a numerical access code with locking mechanism uses the battery power, and
  - the lock comprises a clock and at least one of:
    - an arithmetic digit seed generating matching numbers to the numbers generated by a cloud server digit seed or number generator, or
    - another deterministic number qenerator configured to qenerate a time dependent PIN code, without using an external communication connection.

2. The multi access mode lock system as claimed in claim 1, wherein the battery life is designed as an operation age of the lock, so battery replacements are unnecessary.

3. The multi access mode lock system as claimed in claim 1, wherein the locking mechanism operates based on magnetic interaction of a hard magnet and a semi-hard magnet.

4. The multi access mode lock system as claimed in claim 1, wherein a cloud server can generate a temporary pin code for accessing the lock, which can be messaged to at least one temporary user of property.

5. The multi access mode lock system as claimed in claim 1, wherein a cloud server can generate a temporary pin code for accessing a plurality of said locks, to a plurality of users, and the temporary pin code can be messaged to the users, thereby creating an access right group of temporary users of property.

6. The multi access mode lock system as claimed in claim 1 wherein a plurality of locks comprise a same arithmetic digit seed or deterministic number generator.

7. The multi access mode lock system as claimed in claim 1, wherein three access modes are realized in one lock cylinder.

8. The multi access mode lock system as claimed in claim 1, wherein a cloud server is configured to also comprise at least one of:
- a clock,
- an arithmetic digit seed generating matching numbers to the numbers generated by a lock digit seed or number generator, or
- another deterministic number generator configured to generate a time dependent PIN code, without using an external communication connection.

9. The multi access mode lock system as claimed in claim 8, wherein the cloud server can generate a temporary pin code for accessing the lock, which can be messaged to at least one temporary user of property.

10. A software program product stored in non-transient memory medium, configured to operate a multi access mode lock system, the multi access mode locking system comprising:
- a locking mechanism configured to mechanically open and lock a door;
- a PIN code input interface;
- a physical keyhole;
- an NFC transmitter and/or receiver, configured to accept a key via NFC; and
- a battery, wherein,
- a mechanical key insertion into the physical keyhole is configured to collect work energy from the key insertion and power the locking mechanism using this energy, without using the battery power,
- the NFC transmitter and/or receiver is configured to collect electromagnetic energy from an NFC signal and power the locking mechanism using this energy, without using the battery power, and
- only the PIN code input interface and an access mode using a numerical access code with locking mechanism uses the battery power, and
- the lock comprises a clock and at least one of:
  - an arithmetic digit seed generating matching numbers to the numbers generated by a cloud server digit seed or number generator, or
  - another deterministic number generator configured to generate a time dependent PIN code, without using an external communication connection.

11. The software program product as claimed in claim 10, wherein the battery life is designed as an operation age of the lock, so battery replacements are unnecessary.

12. The software program product as claimed in claim 10, wherein the locking mechanism operates based on magnetic interaction of a hard magnet and a semi-hard magnet.

13. The software program product as claimed in claim 10, wherein a cloud server can generate a temporary pin code for accessing the lock, which can be messaged to at least one temporary user of property.

14. The software program product as claimed in claim 10, wherein a cloud server can generate a temporary pin code for accessing a plurality of said locks, to a plurality of users, and the temporary pin code can be messaged to the users, thereby creating an access right group of temporary users of property.

15. The software program product as claimed in claim 10, wherein a plurality of locks comprise a same arithmetic digit seed or deterministic number generator.

16. The software program product as claimed in claim 10, wherein three access modes are realized in one lock cylinder.

17. The software program product as claimed in claim 10, wherein a cloud server is configured to also comprise at least one of:
- a clock,
- an arithmetic digit seed generating matching numbers to the numbers generated by a lock digit seed or number generator, or
- another deterministic number generator configured to generate a time dependent PIN code, without using an external communication connection.

18. The software program product as claimed in claim 17, wherein the cloud server can generate a temporary pin code for accessing the lock which can be messaged to at least one temporary user of property.

19. A method of operating a multi access mode lock system, the system comprising;
- a locking mechanism configured to mechanically open and lock a door;
- a PIN code input interface;
- a physical keyhole;
- an NFC transmitter and/or receiver, configured to accept a key via NFC; and
- a battery, wherein
- a mechanical key insertion into the physical keyhole collects work energy from the key insertion and power the locking mechanism using this energy, without using the battery power,
- the NFC transmitter and/or receiver collects electromagnetic energy from an NFC signal and powers the locking mechanism using this energy, without using the battery power, and
- only the PIN code input interface and an access mode using a numerical access code with locking mechanism uses battery power, and
- the lock comprises a clock and at least one of:
  - an arithmetic digit seed generating matching numbers to the numbers generated by a cloud server digit seed or number generator, or
  - another deterministic number qenerator configured to qenerate a time dependent PIN code, without using an external communication connection.

20. The method as claimed in claim 19, wherein the battery life is designed as an operation age of the lock so battery replacements are unnecessary.

21. The method as claimed in claim 19, wherein the locking mechanism operates based on magnetic interaction of a hard magnet and a semi-hard magnet.

22. The method as claimed in claim 19, wherein a cloud server can generate a temporary pin code for accessing the lock, which can be messaged to at least one temporary user of property.

23. The method as claimed in claim 19, wherein a cloud server can generate a temporary pin code for accessing a plurality of said locks, to a plurality of users, and the temporary pin code can be messaged to the users, thereby creating an access right group of temporary users of property.

24. The method as claimed in claim 19, wherein a plurality of locks comprise a same arithmetic digit seed or deterministic number generator.

25. The method as claimed in claim 19, wherein three access modes are realized in one lock cylinder.

26. The method as claimed in claim 19, wherein a cloud server is configured to also comprise at least one of:
- a clock,
- an arithmetic digit seed generating matching numbers to the numbers generated by a lock digit seed or number generator, or
- another deterministic number generator configured to generate a time dependent PIN code, without using an external communication connection.

27. The method as claimed in claim 26, wherein the cloud server can generate a temporary pin code for accessing the lock, which can be messaged to at least one temporary user of property.

* * * * *